US009586566B2

United States Patent
Kurz et al.

(10) Patent No.: US 9,586,566 B2
(45) Date of Patent: Mar. 7, 2017

(54) METHOD FOR ACTUATING A HYDRAULIC BRAKING SYSTEM

(71) Applicant: Robert Bosch GmbH, Stuttgart (DE)

(72) Inventors: Florian Kurz, Heilbronn (DE);
Michael Bunk, Leingarten (DE);
Thomas Schmidt, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/687,183

(22) Filed: Apr. 15, 2015

(65) Prior Publication Data

US 2015/0298668 A1      Oct. 22, 2015

(30) Foreign Application Priority Data

Apr. 22, 2014   (DE) .................. 10 2014 207 526

(51) Int. Cl.
| | |
|---|---|
| B60T 8/32 | (2006.01) |
| B60T 13/66 | (2006.01) |
| B60T 7/04 | (2006.01) |
| B60T 13/14 | (2006.01) |
| B60T 13/68 | (2006.01) |
| B60T 8/40 | (2006.01) |

(52) U.S. Cl.
CPC ............ B60T 13/662 (2013.01); B60T 7/042 (2013.01); B60T 8/4059 (2013.01); B60T 13/146 (2013.01); B60T 13/686 (2013.01)

(58) Field of Classification Search
CPC ........ B60T 7/042; B60T 8/176; B60T 8/4059; B60T 8/17636; B60T 13/14; B60T 13/20586; B60T 13/662
USPC .... 303/3, 10, 15, 20, 150, 155, 116.2, 116.4
See application file for complete search history.

(56) References Cited

U.S. PATENT DOCUMENTS

| | | | | |
|---|---|---|---|---|
| 5,924,777 A | * | 7/1999 | Kamikado | B60T 8/17636 303/116.2 |
| 2007/0210648 A1 | * | 9/2007 | Sato | B60T 8/4059 303/155 |
| 2009/0112431 A1 | * | 4/2009 | Davidsson | F16D 48/066 701/69 |
| 2015/0298667 A1 | * | 10/2015 | Kurz | B60T 7/042 303/10 |

* cited by examiner

*Primary Examiner* — Christopher Schwartz
(74) *Attorney, Agent, or Firm* — Gerard Messina

(57) ABSTRACT

In a method for actuating a hydraulic braking system, a hydraulic fluid is temporarily stored in a storage chamber when the antilocking system is activated and recirculated back into the brake circuit with the aid of a recirculation pump. The target pump speed of the recirculation pump depends on the degree of filling of the storage chamber with hydraulic fluid and in addition on the control frequency of the antilocking system.

12 Claims, 2 Drawing Sheets

METHOD FOR ACTUATING A HYDRAULIC BRAKING SYSTEM

BACKGROUND OF THE INVENTION

1. Field of the Invention

The present invention relates to a method for actuating a hydraulic braking system having an antilocking system in a vehicle.

2. Description of the Related Art

Hydraulic braking systems having integrated antilocking systems for preventing a wheel locking in the event of heavy brake actuation are known. The braking systems include one or multiple wheel brake units in one brake circuit, which are hydraulically actuatable, the hydraulic fluid to the wheel brake units being controlled via inlet and outlet valves. The antilocking system includes an electrically drivable recirculation pump and a storage chamber integrated into the brake circuit for receiving hydraulic fluid, which, in the event of an imminent wheel locking, flows from the wheel brake units into the storage chamber via the opened outlet valves. When activating the recirculation pump, the hydraulic fluid is conveyed out of the storage chamber back into the brake circuit. The activation of the recirculation pump is linked to a noise emission.

BRIEF SUMMARY OF THE INVENTION

The object of the present invention is to reduce the noise emission in a hydraulic braking system, which is equipped with an antilocking system, using simple measures.

The method according to the present invention may be used in hydraulic braking systems, which are equipped with an antilocking system for preventing a wheel locking. The pressure of the hydraulic fluid in wheel brake units at the wheels is controlled via the antilocking system in such a way that in the event of an imminent locking or for adjusting the optimum brake slip via a modulation of the pressure build-up or pressure drop, outlet valves are opened to allow hydraulic fluid to flow out of the wheel brake units and to reduce the wheel brake pressure. The outflowing hydraulic fluid is retained in a storage chamber, which is situated in a brake circuit of the braking system, and from which the fluid is conveyed back into the brake circuit through activation of a recirculation pump; the recirculation pump and the storage chamber also form part of the antilocking system. If the wheel brake pressure again drops below a critical value, the outlet valve may be closed and, at the same time, an inlet valve may be opened, so that hydraulic fluid again flows into the wheel brake units and the wheel brake pressure is again restored.

The activation of the recirculation pump, which is connected to an electric pump motor, is linked to a noise emission. In the method according to the present invention, in order to keep the noise emission to a minimum, the target pump speed is controlled preferably at low friction coefficients of the roadway-wheel-combination in such a way that an equilibrium is at least approximately achieved in the level of filling of the storage chamber so that the volume of the hydraulic fluid accommodated in the storage chamber averaged over a defined time interval remains at least approximately constant. A continuous rise and drop of the target pump speed is avoided or reduced; moreover, the pump speed assumes a virtually static equilibrium over a time interval and is thus on a comparatively low level, thereby reducing the total noise level caused by the recirculation pump. At the same time it is ensured that the hydraulic fluid accommodated in the storage chamber is continuously emptied from the storage chamber when the antilocking system is activated with controlled brake pressure, so that a sufficient buffer volume, preferably as a function of the friction coefficient, is always available in the storage chamber.

The target pump speed of the recirculation pump depends on the degree of filling of the storage chamber with hydraulic fluid. The degree of filling is significantly determined by the control frequency of the antilocking system as well as by changing target pressure levels of the antilocking system for changed friction coefficients of the wheel-roadway combination.

The control frequency of the antilocking system is determined by the change over time of the continuous opening and closing of the outlet valve and the inlet valve at a wheel brake unit. In this way, an easily implemented criterion for setting the pump speed is provided. At a higher control frequency of the antilocking system, the pump speed is at a higher level; at a lower frequency it is at a lower level. The setpoint or target speed of the recirculation pump may in each case be held at least approximately constant. The actual speed at least essentially follows the setpoint speed.

Advantageously, an additional dependency results with the friction coefficient between wheel and roadway, the target pump speed of the recirculation pump being lower at a lower friction coefficient than at a higher friction coefficient. For different friction coefficients a curve family results for the target pump speed as a function of the pump volume in the storage chamber, the progression being delimited for low friction coefficients by a lower curve, and for high friction coefficients by an upper curve. A pump-specific maximum speed must be adhered to as a boundary condition.

According to one additional, advantageous embodiment, the relationship between the target pump speed of the recirculation pump and the degree of filling of the storage chamber is split into multiple linear sections, of which at least one section is a function of the target pump speed. The relationship between target pump speed and degree of filling of the storage chamber is split, for example, into three linear sections whose slopes may differ from one another. The center section may form the section whose slope is a function of the control frequency of the antilocking system. The center section advantageously covers the largest area of the filling volume, in particular at least half of the filling volume, so that the first section and the last section, which are assigned to a low or to the maximum degree of filling, cover a correspondingly small area.

The slope is advantageously formed in such a way that a virtually static state is set between the fluid flowing into the storage chamber during the pressure drop and the fluid conveyed out by the recirculation pump in a defined time interval. The slope results from the wheel pressure reduced in the time interval and the associated volume at a set control frequency of the antilocking system so that the storage chamber volume is in the central section at an approximately constant boundary condition.

According to a typical embodiment variant, the relationship between the target pump speed and the degree of filling of the storage chamber has three linear, contiguous sections of which the central section is also a function of the control frequency of the antilocking system. The slope of the central section may be lower for low friction coefficients than the slope of the first section, assigned to low degrees of filling, and the last section, assigned to high degrees of filling. The central section ends, for example, at minimum 80% of the maximum filling volume of the storage chamber. In this way it is ensured that the target pump speed is sufficiently high in order to ensure a sufficient recirculation of hydraulic fluid from the storage chamber and to ensure that the storage chamber is not completely filled with hydraulic fluid.

The method for adapting the target pump speed of the recirculation pump based on defined boundary conditions is carried out in a hydraulic braking device in a vehicle. The different method steps are implemented via signals of a regulating or control device installed in the vehicle, and via which the various adjustable components of the braking system are controlled, in particular the inlet valves and the outlet valves, as well as the recirculation pump.

DETAILED DESCRIPTION OF THE INVENTION

Figure 1:
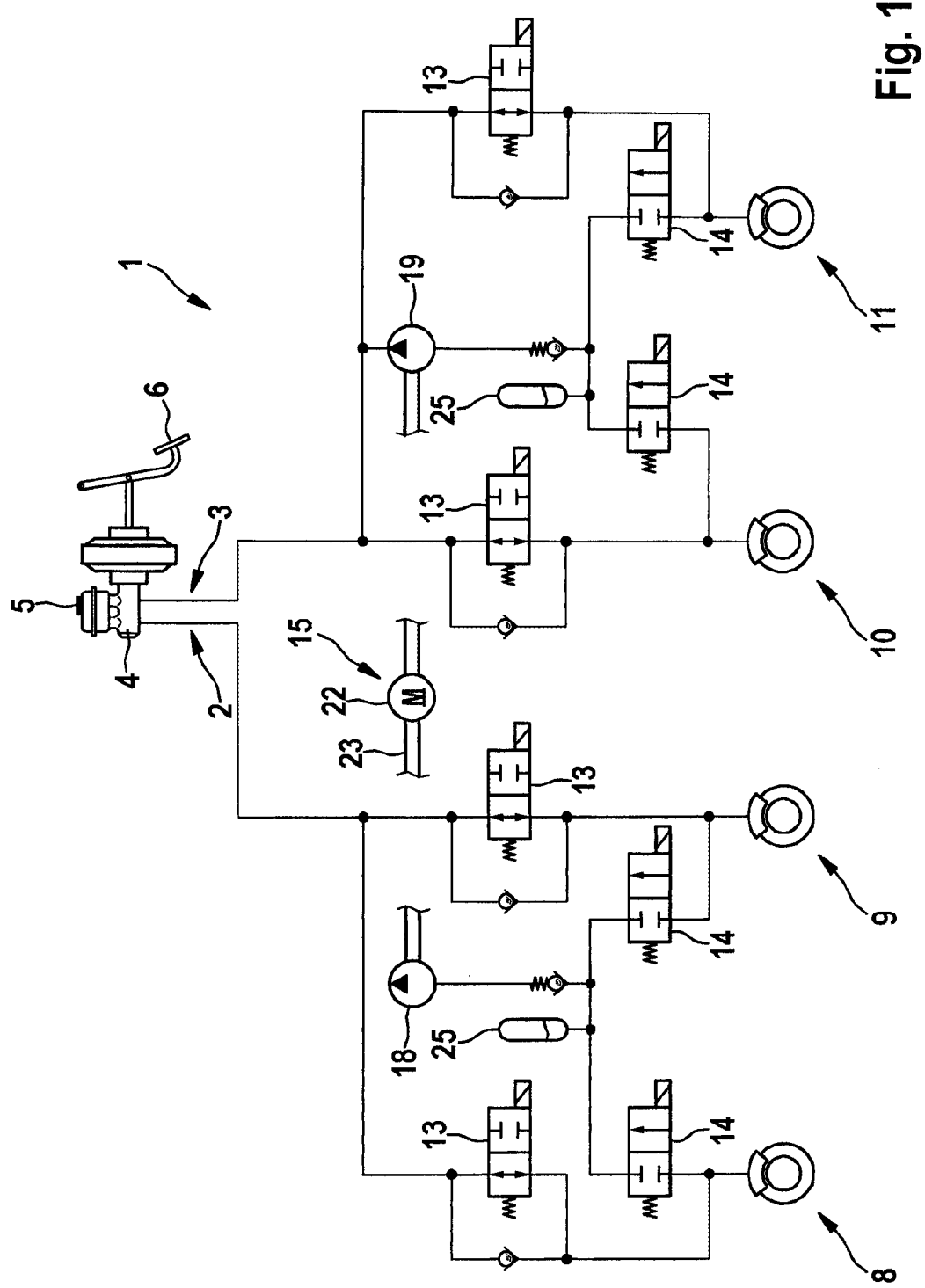
FIG. 1 shows a hydraulic circuit diagram of a vehicle braking system having two brake circuits and an integrated antilocking system.

The hydraulic brake configuration in a braking system 1 depicted in the hydraulic circuit diagram according to FIG. 1 includes a first brake circuit 2 and a second brake circuit 3 for supplying in each case two wheel brake units 8, 9, 10, 11 with hydraulic brake fluid. The distribution of the brake circuits is split diagonally, for example, so that per brake circuit 2, 3, one wheel brake unit is provided on one front wheel and on one rear wheel.

The two brake circuits 2, 3 are connected to a shared main brake cylinder 4, which is supplied with brake fluid via a brake fluid reservoir 5. Main brake cylinder 4 is actuated by the driver via brake pedal 6; the pedal travel applied by the driver may be measured via a pedal travel sensor.

Situated in each brake circuit 2, 3 are inlet valves 13, which are currentless open and with which check valves are associated, through which fluid may flow from the wheel brake units in the direction toward the main brake cylinder.

Each wheel brake unit 8, 9, 10, 11 is associated with an outlet valve 14, which is currentless closed. Each of the outlet valves 14 is linked to the intake side of a pump unit 15, which includes a recirculation pump 18 and 19 in each brake circuit 2, 3. Pump unit 15 is associated with an electric pump motor 22, which activates both recirculation pumps 18 and 19 via a shaft 23. The pressure side of recirculation pumps 18 and 19 empties into the respective brake circuit on the side facing toward the main brake cylinder. Pump unit 15, together with the two recirculation pumps 18 and 19, electric pump motor 22 and shaft 23 are part of an antilocking system for preventing wheel locking, and may also be activated in conjunction with an electronic stability program (ESP).

Situated between outlet valves 14 and the intake side of recirculation pump 18 and 19 is one storage chamber 25 per brake circuit 2, 3, which is used for temporary storage of hydraulic fluid, which is released from wheel brake units 8, 9, 10, 11 through outlet valves 14 during a driving-dynamic intervention. Storage chambers 25 are also part of the antilocking system.

Pressure sensors may be situated in the brake circuits for pressure measurement.

Figure 3:
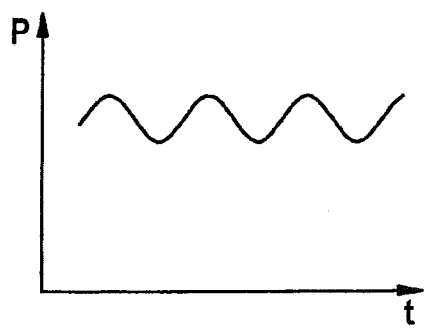
FIG. 3 shows a diagram with the time-dependent curve of the brake pressure in the case of a regulation by the antilocking system.

When the antilocking system is activated, the inlet valves and outlet valves are alternately opened and closed in rapid succession to prevent a wheel from locking. If it is determined that the risk of a wheel locking is imminent, for example, by evaluating measured data of the wheel speed sensors, the regulation is then activated by the antilocking system, inlet valve 13 being closed and outlet valve 14 being opened in order to reduce the wheel brake pressure. Hydraulic fluid may then flow out of the wheel brake unit; the hydraulic fluid is retained in storage chamber 25. Once the wheel brake pressure is reduced, outlet valve 14 is closed again and inlet valve 13 is opened, whereupon the wheel brake pressure is again restored. This process is repeated at a defined control frequency during the activated regulation by the antilocking system, which is shown in the diagram in FIG. 3, in which a rising section in the pressure curve stands for an open inlet valve and a simultaneously closed outlet valve, and a falling section in the pressure curve stands for a closed inlet valve and a simultaneously open outlet valve. The control frequency results from the chronological sequence of the opening and closing of the inlet valve and the outlet valve and is usually fixedly set in the braking system. If necessary, a variably adjustable control frequency may also be considered.

Figure 2:
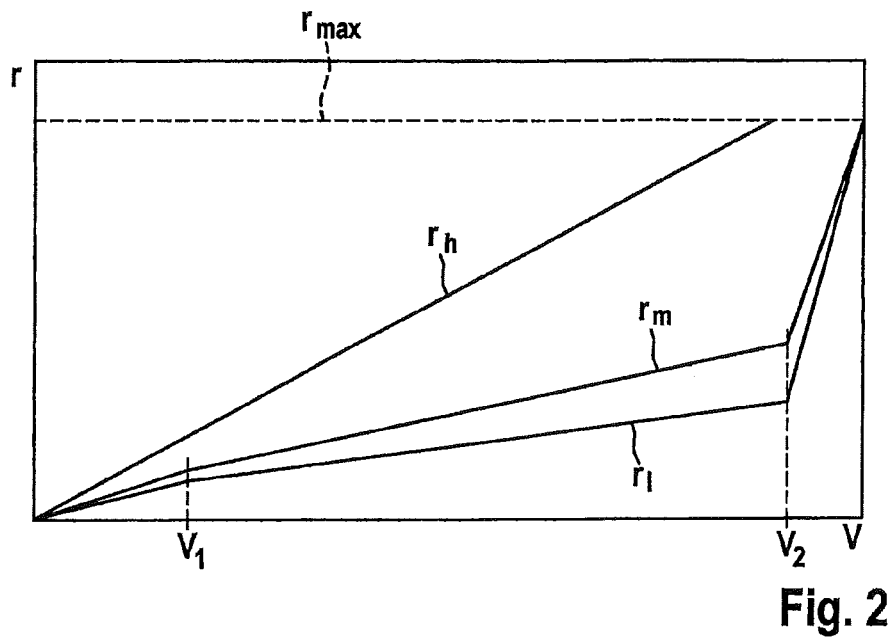
FIG. 2 shows a diagram with the curve of the pump speed of a recirculation pump, which is part of an antilocking system as a function of the degree of filling of a storage chamber in the braking system, shown for different friction coefficients.

FIG. 2 shows a diagram with multiple curve shapes of the pump speed of the recirculation pump as a function of the degree of filling V. Depending on the degree of filling which is to be set or maintained, a different pump speed r results in the curve shape at which the recirculation pump is operated in order to return hydraulic fluid from the storage chamber. In addition, the curve shapes are a function of the instantaneous friction coefficient μ, the curve family being delimited by a lower curve $r_l$ for a small friction coefficient between wheel and roadway, and by an upper curve $r_h$ for a maximum friction coefficient. A curve shape $r_m$ for a medium friction coefficient is also shown as an example. As an additional boundary condition, a maximum speed $r_{max}$ must also be adhered to, which is pump-specific and must not be exceeded.

In the case of small and medium friction coefficients μ, the curve shape of the pump speed shows as a function of the degree of filling three linear sections, a first section reaching from the beginning of the curve to the degree of filling $V_1$, a central section reaching from the degree of filling $V_1$ to a higher degree of filling $V_2$, and a third, highest section reaching to the maximum degree of filling. The central section between degrees of filling $V_1$ and $V_2$ reaches, relatively seen, across the largest area and advantageously covers at least 50% of the degrees of filling. As an example, the lower degree of filling $V_1$ may be at 20% of the maximum volume, and the upper degree of filling $V_2$ may be at 80% of the maximum filling volume.

The pump speed proceeds linearly in each section and shows a positive slope so that a rise is given with increasing degree of filling. The slope of the central section is a function of the control frequency of the antilocking system (FIG. 3), the pump speed rising with increasing control frequency; in particular the central section between the degrees of filling $V_1$ and $V_2$ shows an also rising gradient at increasing control frequency. The gradient of the central section between $V_1$ and $V_2$ is smaller for small friction coefficients than the slope of the first section through $V_1$, as well as significantly smaller than the slope of the third section beyond $V_2$. The significantly rising third section ensures that at a high degree of filling, for example, 80% or 90% with respect to the maximum volume of the storage chamber, a high pump speed and correspondingly a high recirculation of hydraulic fluid back out of the storage chamber is also ensured.

Figure 4:
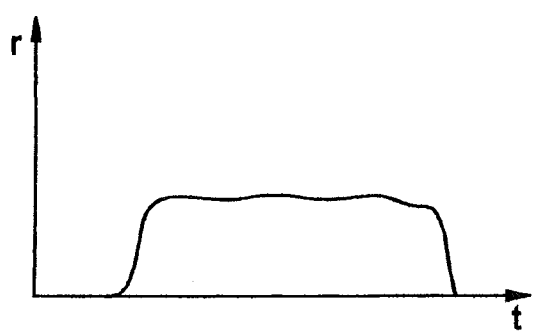
FIG. 4 shows a diagram with the time-dependent curve of the target pump speed of the recirculation pump.

FIG. 4 shows a diagram with the target pump speed which has an approximately constant progression. The actual pump speed follows the target pump speed at least approximately so that a continuous rise and drop of the pump speed during an active regulation of the antilocking system is avoided and the noise level is correspondingly reduced. Furthermore, the level of the pump speed is lower compared to embodiments from the related art so that a lower noise level also results from this.

What is claimed is:

1. A method for actuating a hydraulic braking system having an antilocking system in a vehicle, comprising:
   temporarily storing a hydraulic fluid of a brake circuit in a storage chamber when the antilocking system is activated; and
   subsequently recirculating the hydraulic fluid from the storage chamber into the brake circuit with the aid of a recirculation pump;
   wherein a target pump speed of the recirculation pump is set to a non-zero value as a function of (i) the degree of filling of the storage chamber with the hydraulic fluid and (ii) the control frequency of the antilocking system, the target pump speed rising with increasing control frequency.

2. The method as recited in claim 1, wherein the relationship between the target pump speed of the recirculation pump and the degree of filling of the storage chamber is split into multiple linear sections, of which at least one section is a function of the target pump speed, and each section corresponding to the relationship between the target pump speed and the degree of filling of the storage chamber for a respective friction coefficient between at least one wheel of the vehicle and a roadway.

3. The method as recited in claim 2, wherein at least two of the linear sections have a slope of different magnitudes.

4. The method as recited in claim 3, wherein a total of three rising linear sections are provided, the slope of the central linear section being a function of the target pump speed.

5. The method as recited in claim 4, wherein the third linear section has a larger slope than the central linear section and is delimited by a maximum speed of the recirculation pump.

6. The method as recited in claim 4, wherein the first linear section has a larger slope than the central linear section.

7. The method as recited in claim 4, wherein the target pump speed of the recirculation pump is set additionally as a function of a friction coefficient between the at least one wheel of the vehicle and the roadway.

8. The method as recited in claim 4, wherein the central linear section extends across at least half of the filling volume of the storage chamber.

9. The method as recited in claim 8, wherein the central linear section ends at the latest at 80% of the maximum filling volume.

10. The method as recited in claim 1, wherein the target pump speed varies linearly with respect to the degree of filling of the storage chamber.

11. A system for controlling a hydraulic braking system having an antilocking system in a vehicle, comprising:
    a control unit including a processor configured to control the following:
    temporarily storing a hydraulic fluid of a brake circuit in a storage chamber when the antilocking system is activated; and
    subsequently recirculating the hydraulic fluid from the storage chamber into the brake circuit with the aid of a recirculation pump;
    wherein a target pump speed of the recirculation pump is set to a non-zero value as a function of (i) the degree of filling of the storage chamber with the hydraulic fluid and (ii) the control frequency of the antilocking system, the target pump speed rising with increasing control frequency.

12. The system as recited in claim 11, wherein the target pump speed varies linearly with respect to the degree of filling of the storage chamber.

* * * * *